US009575183B2

(12) United States Patent
Piasse et al.

(10) Patent No.: US 9,575,183 B2
(45) Date of Patent: Feb. 21, 2017

(54) TRACKING MEASUREMENT SYSTEM AND METHOD

(71) Applicant: The Boeing Company, Chicago, IL (US)

(72) Inventors: Michael L. Piasse, St. Charles, MO (US); William T. Edwards, Wentzville, MO (US); Craig M. Farniok, Godfrey, IL (US)

(73) Assignee: The Boeing Company, Chicago, IL (US)

( * ) Notice: Subject to any disclaimer, the term of this patent is extended or adjusted under 35 U.S.C. 154(b) by 133 days.

(21) Appl. No.: 14/674,104

(22) Filed: Mar. 31, 2015

(65) Prior Publication Data

US 2016/0291159 A1    Oct. 6, 2016

(51) Int. Cl.
    *G01B 11/00*      (2006.01)
    *G01S 17/66*      (2006.01)

(52) U.S. Cl.
    CPC ............. *G01S 17/66* (2013.01); *G01B 11/002* (2013.01)

(58) Field of Classification Search
    CPC ...... H01B 11/002; H01B 11/005; H01B 11/26
    USPC . 250/559.29, 559.3, 559.37, 203.1; 356/614, 615, 620; 702/150, 152
See application file for complete search history.

(56) References Cited

U.S. PATENT DOCUMENTS

| 7,312,862 | B2* | 12/2007 | Zumbrunn | G01S 5/163 356/139.03 |
| 8,379,224 | B1 | 2/2013 | Piasse et al. | |
| 9,020,240 | B2* | 4/2015 | Pettersson | G01B 11/005 382/154 |
| 2003/0048459 | A1* | 3/2003 | Gooch | G01B 11/2545 356/620 |
| 2012/0257017 | A1 | 10/2012 | Pettersson et al. | |

OTHER PUBLICATIONS

European Search Report, European Application No. 15202864, dated Jul. 21, 2016.

* cited by examiner

*Primary Examiner* — Kevin Pyo
(74) *Attorney, Agent, or Firm* — Perman & Green LLP

(57) ABSTRACT

A measurement system including a tracking measurement device, a tracked measurement device, and a positioning unit disposed at least partly on the tracked measurement device. The positioning unit includes a tracking groove formed in a surface of the positioning unit, the tracking groove having a non-repeating pattern, and a positioning target configured to interface with the tracking groove so as to be movable within and along at least a portion of the tracking groove, where the positioning target is configured to interface with the tracking measurement device to effect a position determination of the tracked measurement device in a global coordinate system of the tracking measurement device.

20 Claims, 7 Drawing Sheets

TRACKING MEASUREMENT SYSTEM AND METHOD

BACKGROUND

In many three dimensional measurement applications it is generally necessary to reposition measurement devices multiple times at different measurement positions so that measurements can be performed on an entire object. These repositioned measurement devices operate within a local coordinate system where the orientation and origin of the local coordinate system is relative to a respective repositioned measurement device. The measurements taken at each measurement position must be transformed so that all the measurements from the different measurement positions are integrated into a single global coordinate system to obtain a complete measurement or mapping of an object being measured. Generally this integration into the single global coordinate system is performed post measurement (e.g. downstream of the measurement process) using, for example, alignment techniques such as point-pair and best fitting.

Alignment of the different measurements and integration into the global coordinate system is generally time consuming and generally involves fitting adjacent measurements (e.g. scans of point clouds for example) by locating three or more common points in the measured data for an initial fit. Subsequent to the initial fit or alignment the measurement data is best fit using overlapping data. As noted above, this is a time consuming process and is performed well after the measurement device is moved from one measurement point to another measurement point. Alignment of the different measurements is generally a manual process that is often performed on-site to ensure that sufficient data coverage and sufficient overlap is present to align the measurement data. This measurement and alignment process is often critical in production of, for example, aircraft or other manufactured items, and leads to downtime in production.

SUMMARY

Accordingly, a system and method, intended to address the above-identified concerns, would find utility.

One example of the present disclosure relates to a measurement system including a tracking measurement device, a tracked measurement device, and a positioning unit disposed at least partly on the tracked measurement device. The positioning unit includes a tracking groove formed in a surface of the positioning unit, the tracking groove having a non-repeating pattern, and a positioning target configured to interface with the tracking groove so as to be movable within and along at least a portion of the tracking groove, where the positioning target is configured to interface with the tracking measurement device to effect a position determination of the tracked measurement device in a global coordinate system of the tracking measurement device.

One example of the present disclosure relates to a measurement system including a frame having a surface, a tracking groove formed in the surface of the frame, the tracking groove having a non-repeating pattern, and a positioning target configured to interface with the tracking groove so as to be movable within and along at least a portion of the tracking groove, the positioning target being configured to interface with a tracking measurement device to effect a position determination of the frame in a global coordinate system of the tracking measurement device.

One example of the present disclosure relates to a method of measuring an object. The method includes establishing a global coordinate point adjacent the object with a tracking measurement device, disposing at least one tracked measurement device at one location adjacent both the object and the tracking measurement device, capturing measurement information by tracking, with the tracking measurement device, movement of a positioning target within a tracking groove disposed on the at least one tracked measurement device, where the tracking groove provides a non-repeating pattern of movement, and determining, based on the measurement information, a spatial position of the at least one tracked measurement device relative to the global coordinate point.

BRIEF DESCRIPTION OF THE DRAWINGS

Figure 1:
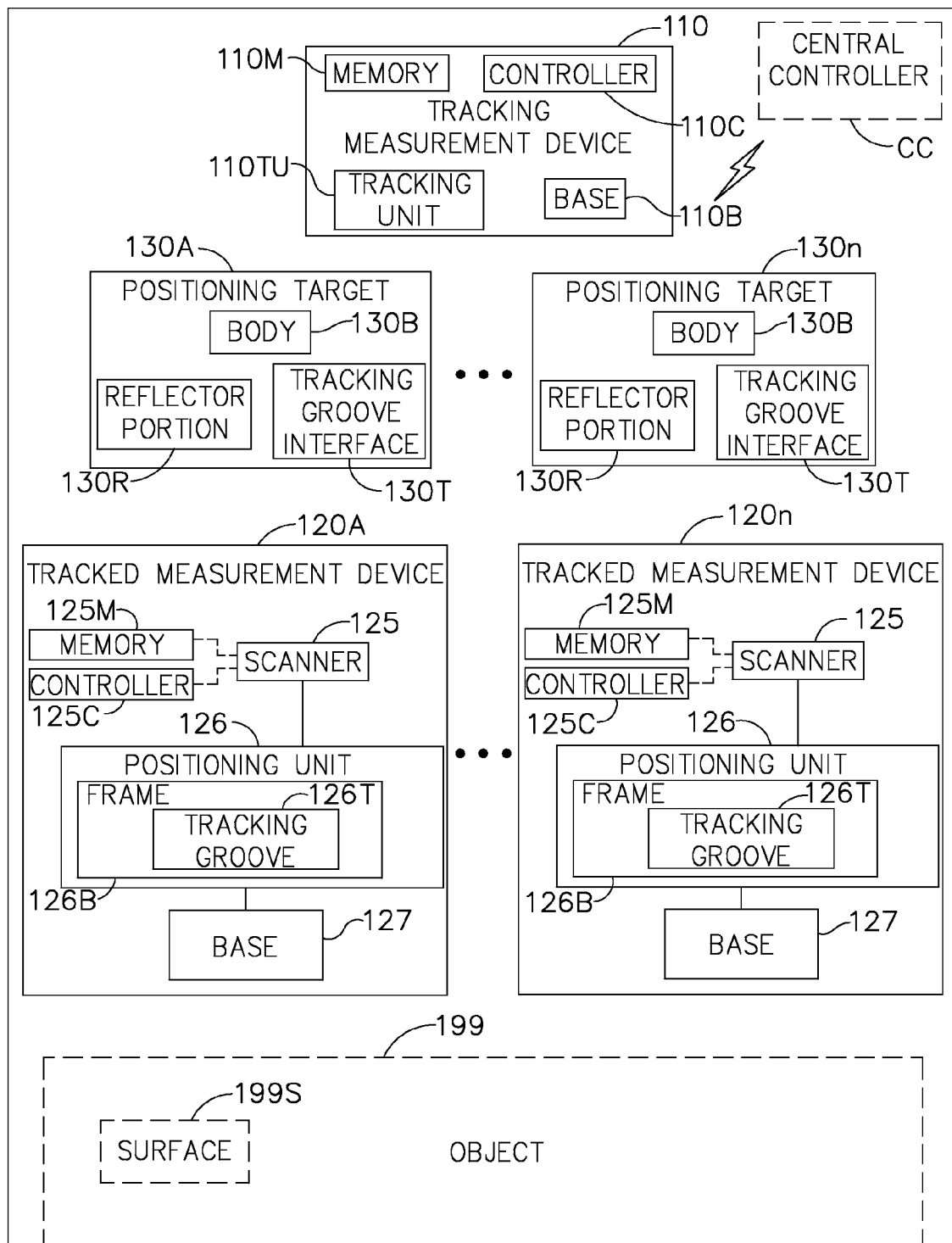
Figure 3:
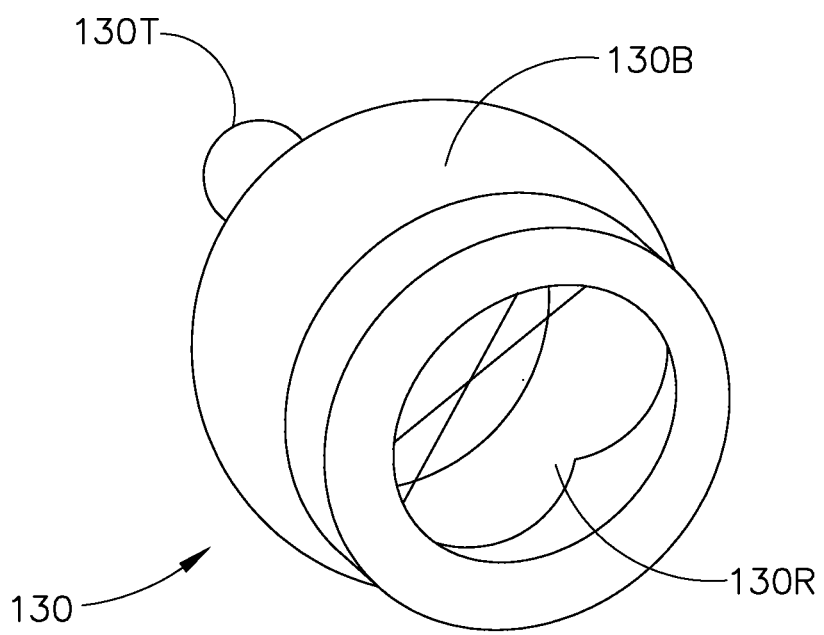
Figure 4:
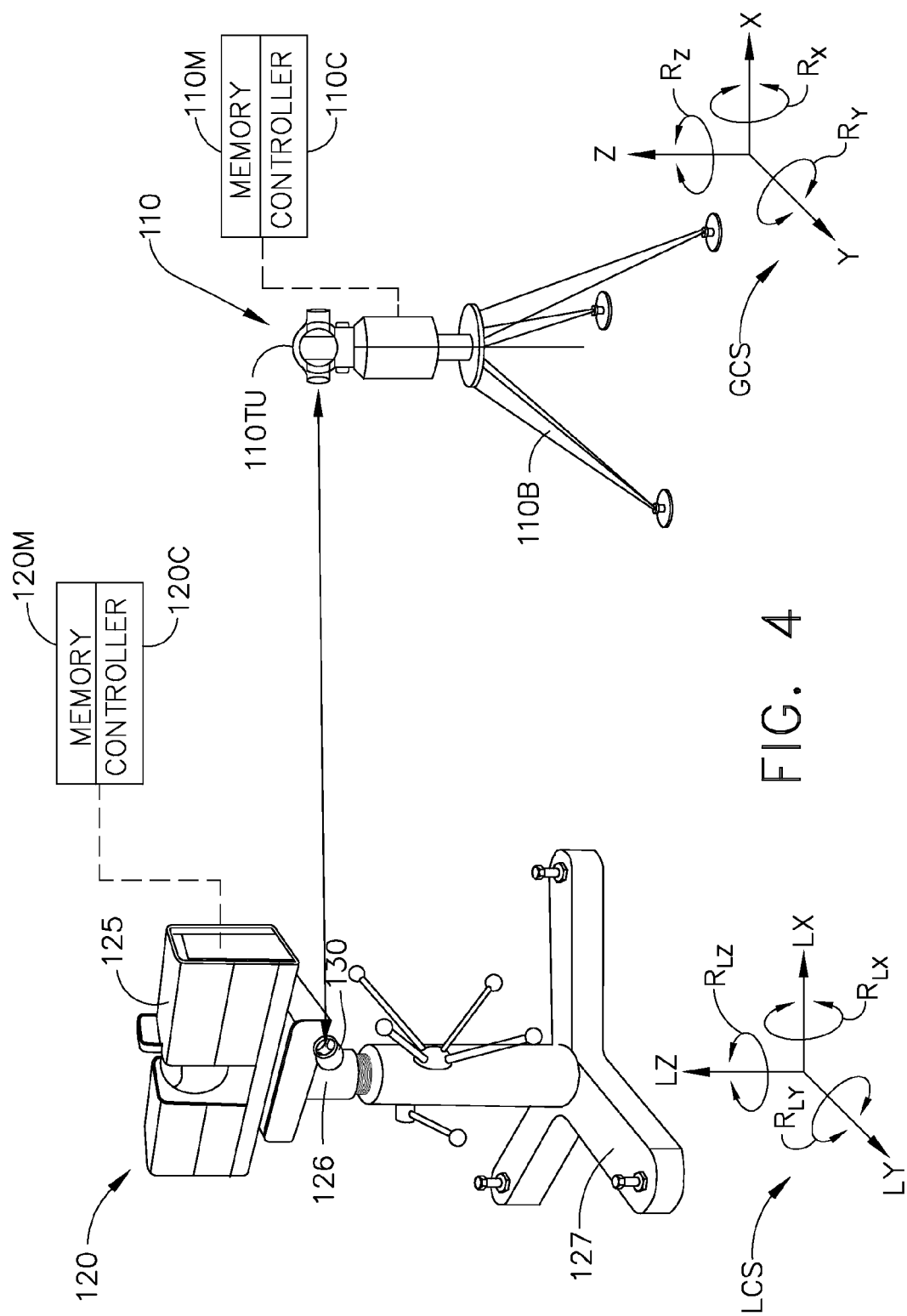
Figure 5:
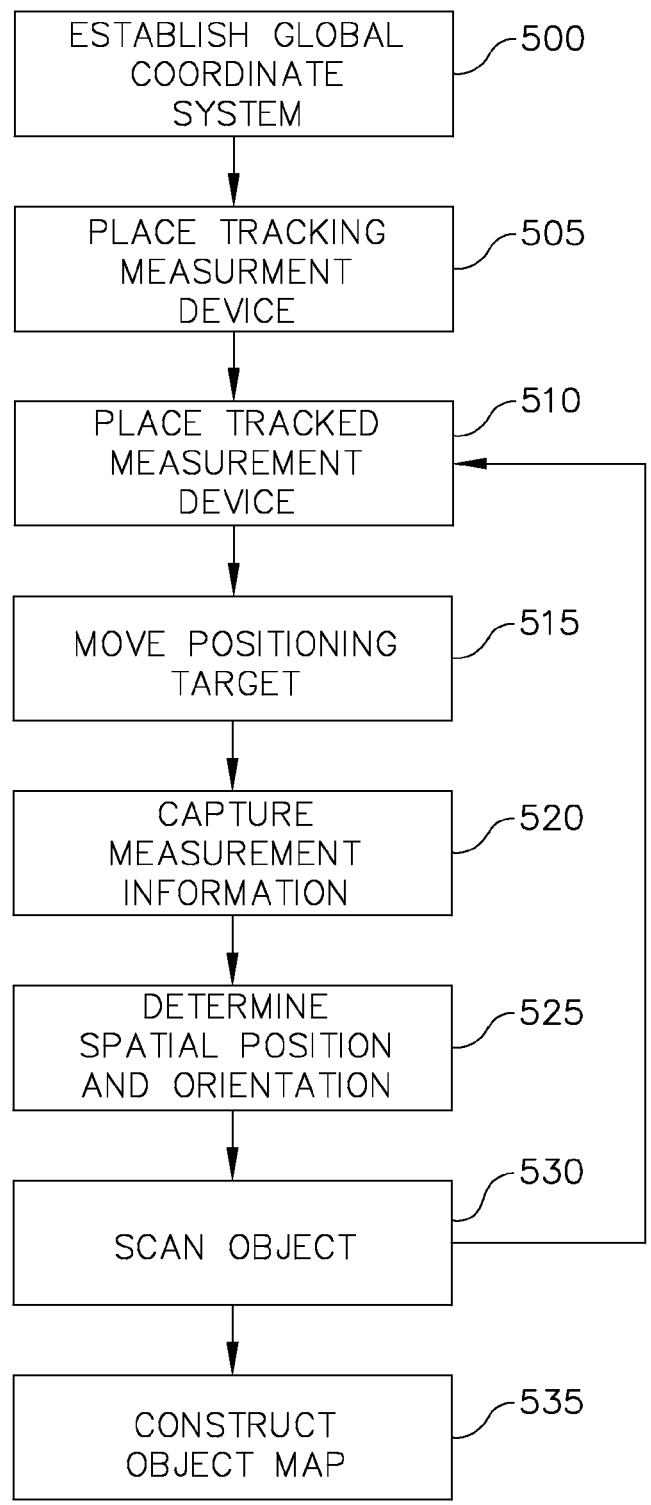
Figure 6:
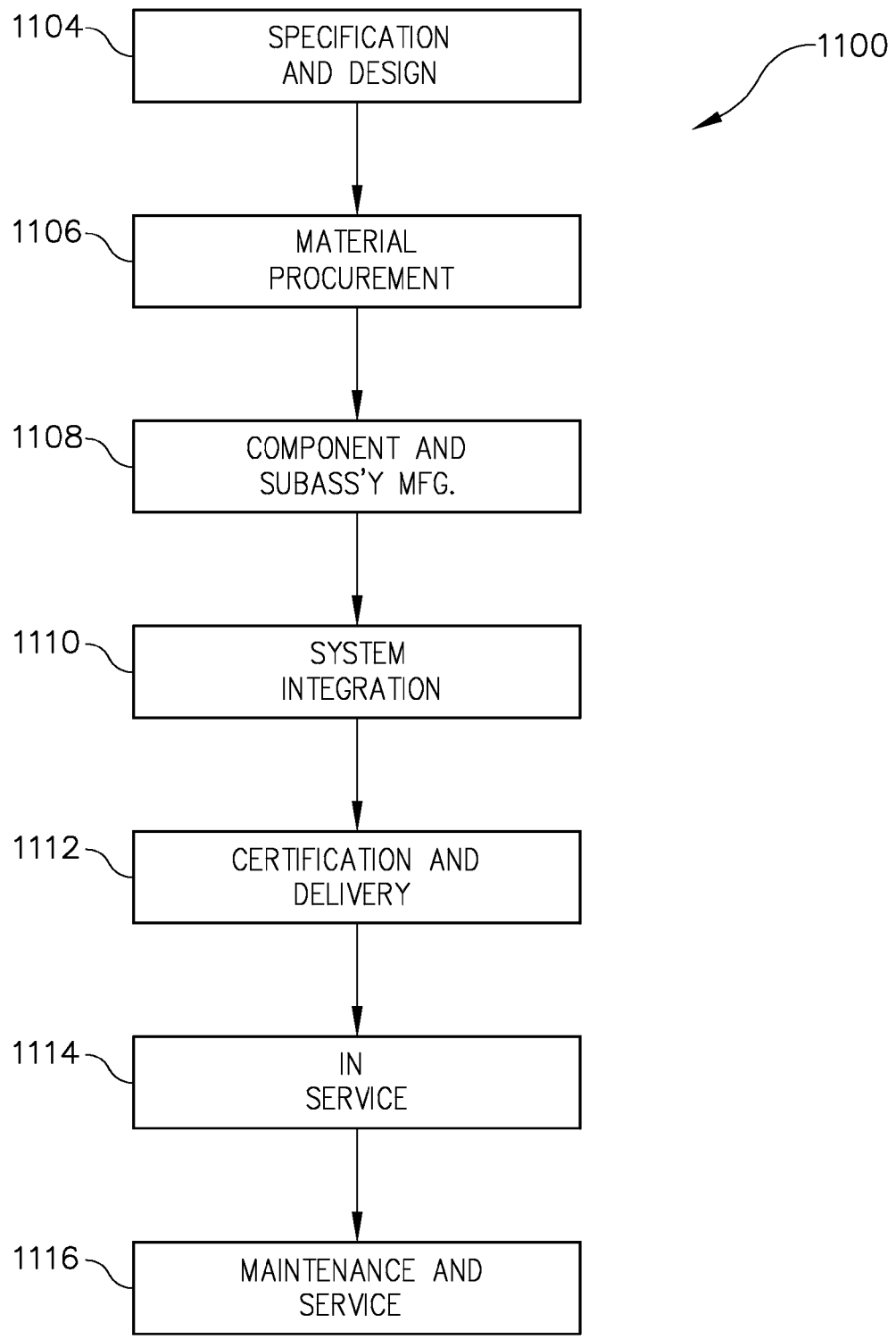
Figure 7:
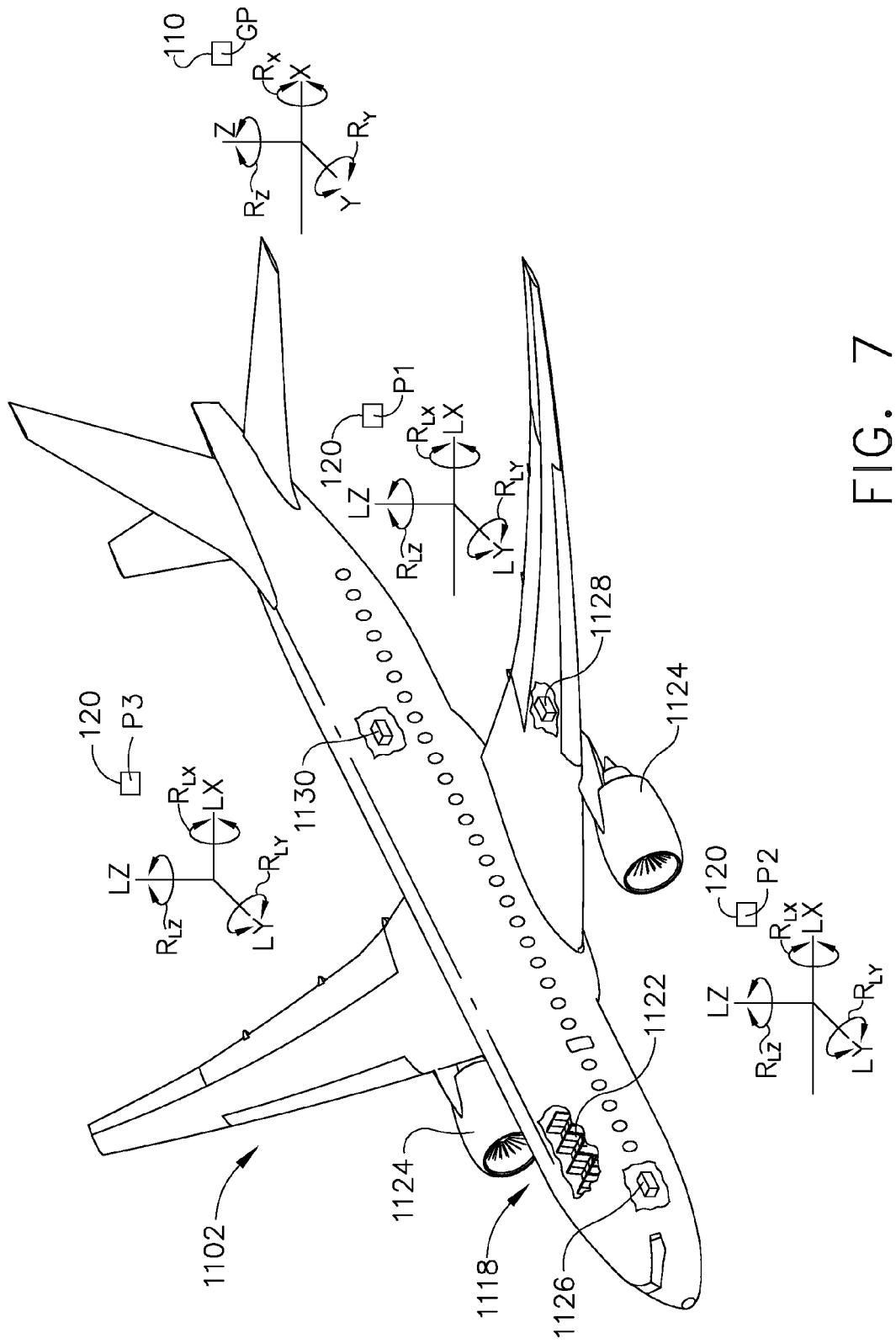

Having thus described examples of the disclosure in general terms, reference will now be made to the accompanying drawings, which are not necessarily drawn to scale, and wherein like reference characters designate the same or similar parts throughout the several views, and wherein:

FIG. 1 is a block diagram of a measurement system, according to one aspect of the present disclosure;

FIGS. 2A-2E are a schematic illustrations of a portion of the measurement system, according to one aspect of the disclosure;

FIG. 3 is a schematic illustration of a portion of the measurement system, according to one aspect of the disclosure;

FIG. 4 is a schematic illustration of a portion of the measurement system, according to one aspect of the disclosure;

FIG. 5 is a flow diagram for a method of measurement of an object, according to an aspect of the disclosure;

FIG. 6 is a flow diagram of aircraft production and service methodology; and FIG. 7 is a schematic illustration of an aircraft including distributed vehicle systems.

In the block diagram(s) referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. Couplings other than those depicted in the block diagrams may also exist. Dashed lines, if any, connecting the various elements and/or components represent couplings similar in function and purpose to those represented by solid lines; however, couplings represented by the dashed lines may either be selectively provided or may relate to alternative or optional aspects of the disclosure. Likewise, elements and/or components, if any, represented with dashed lines, indicate alternative or optional aspects of the disclosure. Environmental elements, if any, are represented with dotted lines.

In the block diagram(s) referred to above, the blocks may also represent operations and/or portions thereof. Lines connecting the various blocks do not imply any particular order or dependency of the operations or portions thereof.

DETAILED DESCRIPTION

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Reference herein to "one example" or "one aspect" means that one or more feature, structure, or characteristic described in connection with the example or aspect is included in at least one implementation. The phrase "one example" or "one aspect" in various places in the specification may or may not be referring to the same example or aspect.

Unless otherwise indicated, the terms "first," "second," "third," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Referring to FIG. 1, the aspects of the measurement system 100 described herein remove inefficiencies of conventional measurement alignment techniques and allows for automated alignments of multiple local coordinate systems (or measurements taken from different measurement points) that are integrated into the measurement process. The measurement system 100 generally includes a tracking measurement device 110, one or more tracked measurement devices 120A-120n and one or more positioning targets 130A-130n.

Referring also to FIG. 4, the tracking measurement device 110 is any suitable device configured to track a target and provide positional and/or orientation information with respect to the target. In one aspect, the tracking measurement device 110 is any suitable coordinate tracking device having a sufficient range to effect measurement or scanning of a predetermined object having any predetermined size, such as an aircraft or other vehicle or object that is larger or smaller than an aircraft. In one aspect the tracking measurement device is a laser tracker. The tracking measurement device 110, in one aspect, includes a tracking unit 110TU mounted to a base 110B. The tracking measurement device 110 also includes, in one aspect, any suitable memory 110M for storing measurement data and a controller or processor 110C connected to the tracking unit 110TU to effect operation of the tracking unit for tracking and obtaining positional and/or orientation information of, for example, any suitable target. The tracking unit 110TU includes any suitable drives to allow movement of the tracking unit 110TU in at least two degrees of freedom for tracking the target.

The tracked measurement device 120 is any suitable device configured for scanning an object 199 to be measured. In one aspect the tracked measurement device is any suitable multi-dimensional scanner. The tracked measurement device 120 includes a scanner 125, a base 127 and a positioning unit 126 (which in one aspect is an adapter or coupler) configured to couple the scanner 126 to the base 127. Any suitable memory 125M and controller or processor 125C are connected to the scanner for storing measurement data and effecting control of the scanner 125 for obtaining the measurement data. The scanner 125 may include any suitable drives to allow movement of the scanner 125 in at least two degrees of freedom for scanning the object 199 and obtaining a plurality of data points corresponding to, for example, spatial locations of points on a surface 199S of the object 199 so that, for example, a point cloud is created and stored as measurement data in the memory 125M. While each of the tracking measurement device 110 and the tracked measurement device 120 are described as having local memories 110M, 125M it should be understood that the tracking measurement device 110 and the tracked measurement device 120, in one aspect, may be part of a wired or wireless network where the measurement data from each of the tracked measurement devices 120 and the tracking measurement device 110 are transmitted to a central controller CC for processing (including e.g. alignment of the measurement data) in any suitable manner. In other aspects, one or more of the tracking measurement device 110 or tracked measurement device 120 may function as the central controller CC. In still other aspects, measurement data saved by the memories 110M, 125M of the tracking measurement device 110 and the tracked measurement device 120 is transferred in any suitable manner to the central controller CC for alignment and processing of the measurement data.

Figures 2A, 2B:
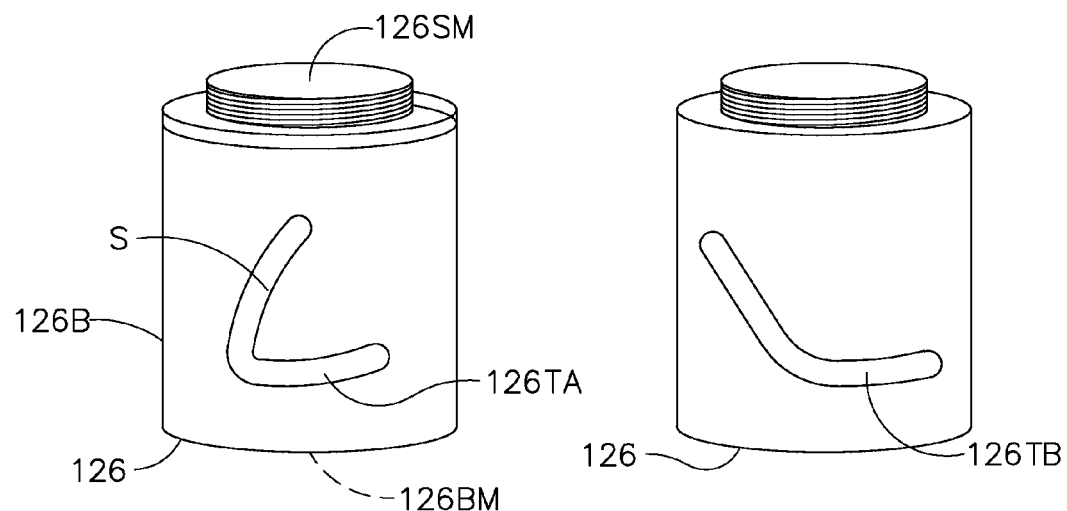
Figures 2C, 2D:
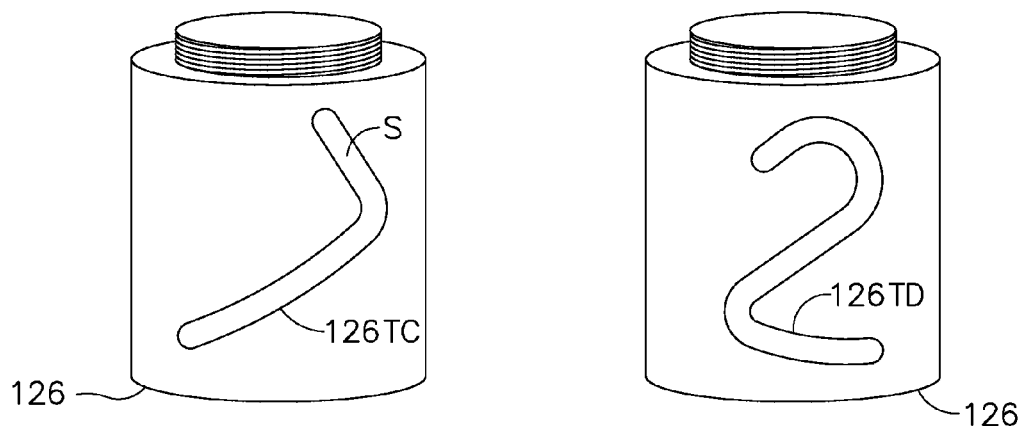
Figure 2E:
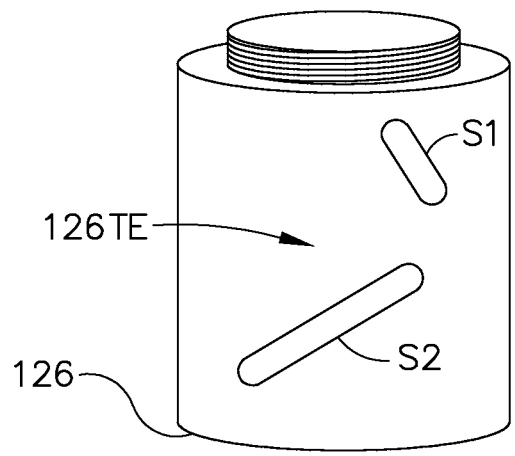

Referring also to FIGS. 2A-2E the positioning unit (or artifact) 126 includes a frame 126B configured for coupling the scanner 125 to the base 127. For example, the frame 126B includes a scanner interface 126SM and a base interface 126BM. The frame 126B is, in one aspect, configured so as to be coupled to the scanner 125 in a predetermined location relative to a local coordinate system LCS of the scanner 125. In one aspect the scanner interface 126SM effects relative positioning of the scanner 125 and the frame 126B. The positioning unit 126 includes one or more suitable tracking groove or element 126T formed in or on (or coupled to) a three dimensional surface of the frame 126B where the position of the one or more tracking groove 126T is/are located at a predetermined position relative to the frame 126B and hence, also located at a predetermined position relative to the local coordinate system LCS of the scanner 125 (such as through the predetermined spatial relationship effecting by the scanner interface 126SM). In one aspect, the one or more tracking groove 126T has any suitable shape or pattern that allows for determining a three dimensional spatial orientation of the one or more tracking groove 126T and hence of a three dimensional spatial orientation of the local coordinate system LCS of the scanner 125. In one aspect the shape or pattern of the one or more tracking groove 126T allows for a single measurement data alignment solution independent of a three dimensional spatial relationship between the tracking measurement device 110 and the tracked measurement device 120. For example, each of the one or more tracking grooves 126T is in one aspect, a substantially continuous, non-repeating, asymmetrical curve pattern having one or more segments S that are arranged transverse to the horizontal and vertical axes X, Y, Z of a global coordinate system GCS (FIG. 4) of the tracking measurement device (in other words the segments S are arranged so as to be independent of a direction of sweep of the tracking measurement device 110). In one aspect each of the one or more tracking grooves 126T is a discontinuous, non-repeating, asymmetrical curve pattern having more than one discontinuous segments S1, S2 that are arranged transverse to the horizontal and vertical axes X, Y, Z of a global coordinate system GCS (FIG. 4) of the tracking measurement device (in other words the segments S are arranged so as to be independent of a direction of sweep of the tracking measurement device 110. In one aspect, a combination of continuous and discontinuous tracking grooves 126T are disposed on a common positioning unit 126. Suitable shapes or patterns for the continuous and/or discontinuous tracking groove 126TA-126TE are illustrated in FIGS. 2A-2E where the groove includes, for example, shapes in the form of the letter "L", the number "2", the number "7", the letter "V" or any other shape/ pattern where the segments of the patterns are arranged so that the segments S, S1, S2 are independent of a direction of sweep of the tracking measurement device 110. It is noted that while only a single shape is illustrated in FIG. 2E for the discontinuous tracking groove 126TE, in other aspects the discontinuous tracking may have any suitable shape substantially similar to those shown in FIGS. 2A-2D where the discontinuity is placed at any suitable position along the tracking groove 126TA-126TD. In one aspect, where more than one tracked measurement device 120A-120n is deployed, each tracked measurement device 120A-120n may include one or more tracking groove 126T where the shape/pattern of the one or more tracking groove 126T is common to each of the tracked measurement device 120A-120n to facilitate the alignment of the measurement data obtained from each of the tracked measurement device 120A-120n, while in other aspects the one or more tracking groove 126T is different for at least one of the more than one tracked measurement device 120A-120n. For example, one tracked measurement device may have a tracking groove having a first predetermined shape/pattern while another of the tracked measurement devices has a tracking groove with a second predetermined shape/pattern that is different than the first predetermined shape/pattern.

While the tracking groove 126T is described as being disposed on or in a surface of the positioning unit 126, in other aspects the tracking groove is located on one or more of the scanner 125 and the base 127. In still other aspects, the positioning unit 126 is integrally formed with the scanner 125 and/or the base 127.

Referring to FIG. 3 the positioning target 130 includes a body or frame 130B, a reflector portion 130R connected to the body 130B and a tracking groove interface 130T connected to the body. In one aspect, at least the tracking groove interface 130T and the body 130B are integrally formed as a single piece unit. In one aspect, tracking groove interface 130T and the tracking groove 126T have mating interfaces that allow at least part of the tracking groove interface 130T to be inserted at least partly into the tracking groove 126T (or vice versa) so that the positioning target 130 can be moved along the tracking groove 126T (e.g. along an entire path of the tacking groove) relative to the tracked measurement device 120. The reflector portion 130R of the positioning target 130 includes any suitable reflector (such as a retroreflector) that is configured to interface with the tracking measurement device 110 (such as interface with a radiated beam from the tracking measurement device 110) to allow the tracking measurement device 110 to obtain a set of measurement data points corresponding to the movement of the positioning target 130 along at least a portion of the tracking groove 126T on the three dimensional surface of the frame 126B. The measurement data points obtained by tracking movement of the positioning target 130 within the tracking groove 126T embodies or otherwise identifies the position of the tracking groove 126T (and hence the local coordinate system LCS of the scanner 125, based on e.g. the known relationship between the tracking groove 126T and the scanner 125) in six degrees of freedom (e.g. X, Y, Z, Rx, Ry, Rz) relative to the global coordinate system GCS. In other words, tracking the movement of positioning target 130 as it moves along at least a portion of the tracking groove 126T provides absolute position data of the local coordinate system LCS and the orientation of the each of the three primary axes LX, LY, LZ of the local coordinate system LCS relative to the global coordinate system GCS of the tracking measurement device 110. The determination of the absolute position data of the local coordinate system LCS and the orientation of the each of the three primary axes LX, LY, LZ of the local coordinate system LCS allows measurement taken at each measurement point (which corresponds to a local coordinate system) to be aligned with the global coordinate system (which effectively automatically aligns the measurement data taken at each measurement point with the measurement data taken at other different measurement points).

Referring now to FIGS. 1, 5 and 7 an exemplary operation of the measurement system 100 will be described with respect to the measurement of the object 199. The object 199 is any suitable object having any suitable surface 199S that can be three dimensionally scanned or mapped. In accordance with one aspect a global coordinate point GP (e.g. the origin of the global coordinate system GCS) is established adjacent the object 199 in any suitable manner (FIG. 5, Block 500). The tracking measurement device 110 is placed at the global coordinate point GP adjacent the object (FIG. 5, Block 505). In one aspect, placement of the tracking measurement device 110 establishes the global coordinate point GP. In one aspect the tracking measurement device 110 is placed adjacent the object 199 at a first altitude (such as above the ground—to enforce a two-dimensional plane), while in other aspects (as described below) the tracking measurement device 110 and the tracked measurement device 120 need not be in the same plane.

At least one tracked measurement device 120 (e.g. the measurement device to be tracked for position) is placed adjacent the object 199 in any suitable measurement location (e.g. a first measurement location P1 which establishes a first local coordinate system LCS) for scanning or mapping the object 199 (FIG. 5, Block 510). The at least one tracked measurement device 120 is placed, in one aspect, at the same altitude as the tracking measurement device 110 (so as to be in a common plane with the tracking measurement device 110) while in other aspects, the at least one tracked measurement device 120 is placed at a different altitude than the tracking measurement device 110 (e.g. so that the tracking measurement device 110 and the at least one tracked measurement device 120 are in different planes). The tracked measurement device 120 is placed adjacent the tracking measurement device 110, or at least within a line of sight of the tracking measurement device 110 to allow the tacking measurement device 110 to track movement of the positioning target 130 within the tracking groove 126T of the tracked measurement device 120.

The positioning target 130 is moved along the tracking groove 126T (FIG. 5, Block 515) such that measurement information (e.g. first measurement information corresponding to the first measurement location) is captured by tracking the movement of the positioning target 130 with the tracking measurement device 110 (FIG. 5, Block 520). As noted above, in one aspect the tracking groove 126T has a continuous segment S such that the positioning target 130 is continually moved along the continuous segment S or at least a portion of the continuous segment S while in other aspects the tracking groove 126T has two or more discontinuous segments S1, S2 such that the positioning target 130 is moved along at least a portion of one segment S1 and then moved along at least a portion of the other segment(s) S2. The placement of the tracked measurement device 120 and the movement of the positioning target 130 are linked for the determination of a spatial position of the at least one tracked measurement device 120. As such Blocks 510 and 515 in FIG. 5 are, in one aspect, performed substantially simultaneously (e.g. at the substantially the same time or in rapid succession) while in other aspects, any suitable period of time may pass between the placement of the at least one tracked measurement device 120 and the movement of the positioning target 130. The spatial position (e.g. absolute position and orientation in six degrees of freedom X, Y, Z, Rx, Ry, Rz relative to the global coordinate system GCS) of the at least one tracked measurement device 120 (and the associated local coordinate system LCS) is determined in any suitable manner, relative to the global coordinate system GCS of the tracked measurement device 110 based on the captured measurement information from moving the positioning target 130 within the tracking groove 126T (FIG. 5, Block 525). In one aspect, the spatial position of the at least one tracked measurement device 120 (and the respective local coordinate system LCS) is determined by the controller 110C of the tracking measurement device 110 or any other suitable controller such as the central controller CC. In one aspect, determining the spatial position of the at least one tracked measurement device 120 relative to the tracking measurement device 110 (e.g. relative to the global coordinate system GCS) includes training and matching, wherein training includes the first and second measurement devices co-witness the same training pattern (e.g. the pattern formed by moving the positioning target 130 through at least a portion of the tracking groove 126T).

The object 199 (or at least the surface 199S of the object) is scanned with the tracked measurement device 120 to measure (e.g. record) a first plurality of object angles and distances (e.g. between the surface 199S and the second measurement device) to establish a plurality of points on the surface 199S of the object 199 from an origin of the local coordinate system LCS (e.g. from the first measurement location P1) (FIG. 5, Block 530).

In one aspect the at least one tracked measurement device 120 is moved to second measurement position P2 adjacent the object 199 and the tracking measurement device 110 (e.g. within a line of sight of the tracking measurement device 110) (FIG. 5, Block 535). In other aspects a second tracked measurement device 120 is placed at the second measurement position. Movement of the at least one tracked measurement device 120 or placement of the second measurement device 120 establishes a position of a second local coordinate system LCS from which all object measurements made by the tracked measurement device are based. Similar to that described above, the at least one tracked measurement device 120 (or the second tracked measurement device) is placed, in one aspect, at the same altitude as the tracking measurement device 110 while in other aspects, the at least one tracked measurement device 120 (or the second tracked measurement device) is placed at a different altitude than the tracking measurement device 110.

The positioning target 130 is moved along the tracking groove 126T (e.g. along the continuous segment S or the discontinuous segments S1, S2 as described above) (FIG. 5, Block 515) of the tracked measurement device 120 located at the second measurement position P2 such that measurement information (e.g. second measurement information corresponding to the second measurement location) is captured by tracking the movement of the positioning target 130 with the tracking measurement device 110 (FIG. 5, Block 520). The spatial position (e.g. absolute position and orientation in six degrees of freedom X, Y, Z, Rx, Ry, Rz relative to the global coordinate system GCS) of the at least one tracked measurement device 120 (and the associated second local coordinate system LCS) is determined in any suitable manner, relative to the global coordinate system GCS of the tracked measurement device 110 based on the captured measurement information from moving the positioning target 130 within the tracking groove 126T (FIG. 5, Block 525). In one aspect, the spatial position of the at least one tracked measurement device 120 at the second measurement position P2 (and the respective second local coordinate system LCS) is determined by the controller 110C of the tracking measurement device 110 or any other suitable controller such as the central controller CC. In one aspect, determining the spatial position of the at least one tracked measurement device 120 at the second measurement position P2 relative to the tracking measurement device 110 (e.g. relative to the global coordinate system GCS) includes training and matching, wherein training includes the first and second measurement devices co-witness the same training pattern (e.g. the pattern formed by moving the positioning target 130 through at least a portion of the tracking groove 126T).

The object 199 (or at least the surface 199S of the object) is scanned with the tracked measurement device 120 at the second measurement position P2 to measure (e.g. record) a second plurality of object angles and distances (e.g. between the surface 199S and the tracked measurement device) to establish a plurality of points on the surface 199S of the object 199 from an origin of the second local coordinate system LCS (e.g. from the second measurement location P2) (FIG. 5, Block 530).

In a manner similar to that described above, in one aspect the at least one tracked measurement device 120 is moved to third measurement position P3 adjacent the object 199 and the tracking measurement device 110 (e.g. within a line of sight of the tracking measurement device 110) (FIG. 5, Block 535). In other aspects a third tracked measurement device 120 is placed at the third measurement position. Movement of the at least one tracked measurement device 120 or placement of the third measurement device 120 establishes a position of a third local coordinate system LCS from which all object measurements made by the tracked measurement device 120 are based. Similar to that described above, the at least one tracked measurement device 120 (or the third tracked measurement device) is placed, in one aspect, at the same altitude as the tracking measurement device 110 while in other aspects, the at least one tracked measurement device 120 (or the second tracked measurement device) is placed at a different altitude than the tracking measurement device 110.

The positioning target 130 is moved along the tracking groove 126T (e.g. along the continuous segment S or the discontinuous segments S1, S2 as described above) (FIG. 5, Block 515) of the tracked measurement device 120 located at the third measurement position P3 such that measurement information (e.g. third measurement information corresponding to the second measurement location) is captured by tracking the movement of the positioning target 130 with the tracking measurement device 110 (FIG. 5, Block 520). The spatial position (e.g. absolute position and orientation in six degrees of freedom X, Y, Z, Rx, Ry, Rz relative to the global coordinate system GCS) of the at least one tracked measurement device 120 (and the associated third local coordinate system LCS) is determined in any suitable manner, relative to the global coordinate system GCS of the tracked measurement device 110 based on the captured measurement information from moving the positioning target 130 within the tracking groove 126T (FIG. 5, Block 525). In one aspect, the spatial position of the at least one tracked measurement device 120 at the third measurement position P3 (and the respective third local coordinate system LCS) is determined by the controller 110C of the tracking measurement device 110 or any other suitable controller such as the central controller CC. In one aspect, determining the spatial position of the at least one tracked measurement device 120 at the third measurement position P3 relative to the tracking measurement device 110 (e.g. relative to the global coordinate system GCS) includes training and matching, wherein training includes the first and second measurement devices co-witness the same training pattern (e.g. the pattern formed by moving the positioning target 130 through at least a portion of the tracking groove 126T).

The object 199 (or at least the surface 199S of the object) is scanned with the tracked measurement device 120 at the third measurement position P3 to measure (e.g. record) a third plurality of object angles and distances (e.g. between the surface 199S and the tracked measurement device) to establish a plurality of points on the surface 199S of the object 199 from an origin of the third local coordinate system LCS (e.g. from the third measurement location P2) (FIG. 5, Block 530).

The tracked measurement device 120 may be moved to any suitable number of measurement locations for scanning the object 199 such that the entire object 199 (or any desired portion of the object 199) is scanned.

A map (e.g. three dimensional map or scanned image) of the object 199 is constructed based on the object measurement data obtained by the tacked measurement device 120 at the measurement locations P1, P2, P3, etc. (FIG. 5, Block 535). Here the construction of the map includes aligning the object measurement data from the measurement locations P1, P2, P3 based on the absolute position and orientation (e.g. in six degrees of freedom X, Y, Z, Rx, Ry, Rz relative to the global coordinate system GCS) of the tacking groove 126T at each of the measurement locations P1, P2, P3. Because the absolute position and orientation in six degrees of freedom X, Y, Z, Rx, Ry, Rz of the tracking groove 126T is known relative to the global coordinate system GCS at each measurement location P1, P2, P3 the measurement data can be aligned quickly and without any of the inefficiencies of conventional alignment techniques (e.g. point pair and best fit) as one alignment solution is forced due to the known relationship of the tracking groove 126T (and hence the local coordinate system LCS at each measurement position P1, P2, P3) and the origin of the global coordinate system GCS.

As described above, the unique shape of the tracking groove 126T is used to calculate the three dimensional position of the tracked measurement device 120 by moving the positioning target 130 (or similar device) through the tracking groove 126T for producing absolute position data and orientation of the three primary axes of the tracked measurement device associated with the tracking groove 126T. The known relationship of the tracked measurement device 120 and the origin of the global coordinate system GCS (as determined using the tracking groove 126T) allows for time efficient alignment of measurement data obtained from different measurement positions. Alignment of the object measurement data from each of the measurement positions P1, P2, P3, etc. is established upon determining the spatial position of the at least one tracked measurement device relative to the global coordinate point at each of the measurement positions P1, P2, P3, etc.

The disclosure and drawing figures describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, in some aspects of the disclosure, not all operations described herein need be performed.

Examples of the disclosure may be described in the context of an aircraft manufacturing and service method 1100 as shown in FIG. 6 and an aircraft 1102 as shown in FIG. 7. During pre-production, illustrative method 1100 may include specification and design 1104 of the aircraft 1102 and material procurement 1106. During production, component and subassembly manufacturing 1108 and system integration 1110 of the aircraft 1102 take place. Thereafter, the aircraft 1102 may go through certification and delivery 1112 to be placed in service 1114. While in service by a customer, the aircraft 1102 is scheduled for routine maintenance and service 1116 (which may also include modification, reconfiguration, refurbishment, and so on).

Each of the processes of the illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 7, the aircraft 1102 produced by the illustrative method 100 may include an airframe 1118 with a plurality of high-level systems and an interior 1122. Examples of high-level systems, which are distributed throughout the aircraft, include one or more of a propulsion system 1124, an electrical power system 1126, a hydraulic system 1128, and an environmental system 1130. Any number of other systems may be included. Although an aerospace example is shown, the principles of the invention may be applied to other industries, such as the automotive industry.

System and methods shown or described herein may be employed during any one or more of the stages of the manufacturing and service method 1100. For example, components or subassemblies corresponding to component and subassembly manufacturing 1108 may be fabricated or manufactured in a manner similar to components or subassemblies produced while the aircraft 1102 is in service. Also, one or more aspects of the system, method, or combination thereof may be utilized during the production states 1108 and 1110, for example, by substantially expediting assembly of or reducing the cost of an aircraft 1102. Similarly, one or more aspects of the system or method realizations, or a combination thereof, may be utilized, for example and without limitation, while the aircraft 1102 is in service, e.g., operation, maintenance and service 1116.

Different examples and aspects of the system and methods are disclosed herein that include a variety of components, features, and functionality. It should be understood that the various examples and aspects of the system and methods disclosed herein may include any of the components, features, and functionality of any of the other examples and aspects of the system and methods disclosed herein in any combination, and all of such possibilities are intended to be within the spirit and scope of the present disclosure.

Many modifications and other examples of the disclosure set forth herein will come to mind to one skilled in the art to which the disclosure pertains having the benefit of the teachings presented in the foregoing descriptions and the associated drawings.

In one or more aspects of the present disclosure a measurement system includes a tracking measurement device; a tracked measurement device; and a positioning unit disposed at least partly on the tracked measurement device, the positioning unit including a tracking groove formed in a surface of the positioning unit, the tracking groove having a non-repeating pattern, and a positioning target configured to interface with the tracking groove so as to be movable within and along at least a portion of the tracking groove, where the positioning target is configured to interface with the tracking measurement device to effect a position determination of the tracked measurement device in a global coordinate system of the tracking measurement device.

In one or more aspects of the present disclosure the tracking groove has a non-repeating continuous pattern.

In one or more aspects of the present disclosure the tracking groove has a non-repeating discontinuous pattern.

In one or more aspects of the present disclosure the positioning target comprises a retroreflector and the tracking measurement device comprises a laser tracker.

In one or more aspects of the present disclosure the tracked measurement device comprises a three dimensional scanner.

In one or more aspects of the present disclosure the tracked measurement device comprises a scanner and a base, the positioning unit being disposed between the scanner and the base and being configured to couple the scanner to the base.

In one or more aspects of the present disclosure the tracked measurement device comprises a scanner and a base, the positioning unit being disposed on one of the scanner and the base.

In one or more aspects of the present disclosure the tracking measurement device is configured to track movement of the positioning target within the tracking groove for determining a set of data points correlating a spatial orientation of the tracking groove to the global coordinate system.

In one or more aspects of the present disclosure the tracking groove comprises an asymmetrical pattern.

In one or more aspects of the present disclosure a measurement system includes a frame having a surface; a tracking groove formed in the surface of the frame, the tracking groove having a non-repeating pattern; and a positioning target configured to interface with the tracking groove so as to be movable within and along at least a portion of the tracking groove, the positioning target being configured to interface with a tracking measurement device to effect a position determination of the frame in a global coordinate system of the tracking measurement device.

In one or more aspects of the present disclosure the tracking groove has a non-repeating continuous pattern.

In one or more aspects of the present disclosure the tracking groove has a non-repeating discontinuous pattern.

In one or more aspects of the present disclosure the positioning target comprises a retroreflector and the tracking measurement device comprises a laser tracker.

In one or more aspects of the present disclosure the frame includes a scanner interface and a base interface such as to form a coupler configured to couple a tracked measurement device to a tracked measurement device base.

In one or more aspects of the present disclosure the frame is disposed between the tracked measurement device and the tracked measurement device base.

In one or more aspects of the present disclosure the tracked measurement device comprises a three dimensional scanner.

In one or more aspects of the present disclosure the tracking groove comprises an asymmetrical pattern.

In one or more aspects of the present disclosure method of measuring an object includes establishing a global coordinate point adjacent the object with a tracking measurement device; disposing at least one tracked measurement device at one location adjacent both the object and the tracking measurement device; capturing measurement information by tracking, with the tracking measurement device, movement of a positioning target within a tracking groove disposed on the at least one tracked measurement device, where the tracking groove provides a non-repeating pattern of movement; and determining, based on the measurement information, a spatial position of the at least one tracked measurement device relative to the global coordinate point.

In one or more aspects of the present disclosure the tracking groove provides a non-repeating continuous pattern of movement.

In one or more aspects of the present disclosure the tracking groove provides a non-repeating discontinuous pattern of movement.

In one or more aspects of the present disclosure the method further includes disposing the at least one tracked measurement device at another location adjacent both the object and the tracking measurement device; capturing second measurement information by tracking, with the tracking measurement device, movement of a positioning target within a tracking groove disposed on the at least one tracked measurement device, where the tracking groove provides a non-repeating pattern of movement; and determining, based on the second measurement information, a second spatial position of the at least one tracked measurement device relative to the global coordinate point.

In one or more aspects of the present disclosure the method further includes obtaining first object measurement data at the spatial position with the at least one tracked measurement device; and obtaining second object measurement data at the spatial position with the at least one tracked measurement device; wherein alignment of the first and second object measurement data with one another is effected based on a relation between a determined spatial orientation of the tracking groove at each of the spatial position and second spatial position and the global coordinate point.

In one or more aspects of the present disclosure the method further includes constructing a map of the object based on the first and second object measurement data.

In one or more aspects of the present disclosure the map is a three dimensional map.

In one or more aspects of the present disclosure alignment of the first and second object measurement data is established upon determining the spatial position and the second spatial position of the at least one tracked measurement device relative to the global coordinate point.

In one or more aspects of the present disclosure the non-repeating pattern of movement is common to each of the at least one tracked measurement device.

In one or more aspects of the present disclosure the at least one tracked measurement device is moved from the one location to the another location for capturing both the measurement information and the second measurement information.

In one or more aspects of the present disclosure the at least one tracked measurement device comprises more than one measurement device located at each of the one location and the another location.

In one or more aspects of the present disclosure the spatial position is determined in six degrees of freedom.

Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain illustrative combinations of elements and/or functions, it should be appreciated that different combinations of elements and/or functions may be provided by alternative implementations without departing from the scope of the appended claims.

What is claimed is:

1. A measurement system comprising:
a tracking measurement device;
a tracked measurement device; and
a positioning unit disposed at least partly on the tracked measurement device, the positioning unit including
a tracking groove formed in a surface of the positioning unit, the tracking groove having a non-repeating pattern, and
a positioning target configured to interface with the tracking groove so as to be movable within and along at least a portion of the tracking groove,
where the positioning target is configured to interface with the tracking measurement device to effect a position determination of the tracked measurement device in a global coordinate system of the tracking measurement device.

2. The measurement system of claim 1, wherein the tracking groove has a non-repeating continuous pattern.

3. The measurement system of claim 1, wherein the tracking groove has a non-repeating pattern.

4. The measurement system of claim 1, wherein the tracked measurement device comprises a scanner and a base, the positioning unit being disposed between the scanner and the base and being configured to couple the scanner to the base.

5. The measurement system of claim 1, wherein the tracked measurement device comprises a scanner and a base, the positioning unit being disposed on one of the scanner and the base.

6. The measurement system of claim 1, wherein the tracking measurement device is configured to track movement of the positioning target within the tracking groove for determining a set of data points correlating a spatial orientation of the tracking groove to the global coordinate system.

7. The measurement system of claim 1, wherein the tracking groove comprises an asymmetrical pattern.

8. A measurement system comprising:
a frame having a surface;
a tracking groove formed in the surface of the frame, the tracking groove having a non-repeating pattern; and
a positioning target configured to interface with the tracking groove so as to be movable within and along at least a portion of the tracking groove, the positioning target being configured to interface with a tracking measurement device to effect a position determination of the frame in a global coordinate system of the tracking measurement device.

9. The measurement system of claim 8, wherein the tracking groove has a non-repeating continuous pattern.

10. The measurement system of claim 8, wherein the tracking groove has a non-repeating discontinuous pattern.

11. The measurement system of claim 8, wherein the tracking groove comprises an asymmetrical pattern.

12. A method of measuring an object, the method comprising:
establishing a global coordinate point adjacent the object with a tracking measurement device;
disposing at least one tracked measurement device at one location adjacent both the object and the tracking measurement device;
capturing measurement information by tracking, with the tracking measurement device, movement of a positioning target within a tracking groove disposed on the at least one tracked measurement device, where the tracking groove provides a non-repeating pattern of movement; and
determining, based on the measurement information, a spatial position of the at least one tracked measurement device relative to the global coordinate point.

13. The method of claim 12, wherein the tracking groove provides a non-repeating continuous pattern of movement.

14. The method of claim 12, wherein the tracking groove provides a non-repeating discontinuous pattern of movement.

15. The method of claim 12, further comprising:
disposing the at least one tracked measurement device at another location adjacent both the object and the tracking measurement device;
capturing second measurement information by tracking, with the tracking measurement device, movement of a positioning target within a tracking groove disposed on the at least one tracked measurement device, where the tracking groove provides a non-repeating pattern of movement; and
determining, based on the second measurement information, a second spatial position of the at least one tracked measurement device relative to the global coordinate point.

16. The method of claim 15, further comprising:
obtaining first object measurement data at the spatial position with the at least one tracked measurement device; and
obtaining second object measurement data at the spatial position with the at least one tracked measurement device,
wherein alignment of the first and second object measurement data with one another is effected based on a relation between a determined spatial orientation of the tracking groove at each of the spatial position and second spatial position and the global coordinate point.

17. The method of claim 16, wherein alignment of the first and second object measurement data is established upon determining the spatial position and the second spatial position of the at least one tracked measurement device relative to the global coordinate point.

18. The method of claim 15, wherein the at least one tracked measurement device is moved from the one location to the another location for capturing both the measurement information and the second measurement information.

19. The method of claim 15, wherein the at least one tracked measurement device comprises more than one measurement device located at each of the one location and the another location.

20. The method of claim 12, wherein the spatial position is determined in six degrees of freedom.

* * * * *